Patented Nov. 21, 1950

2,530,416

UNITED STATES PATENT OFFICE 2,530,416

PROCESS FOR RECOVERING VITAMIN $B_{12}$

Frank J. Wolf, Westfield, N. J., assignor to Merck & Co., Inc., Rahway, N. J., a corporation of New Jersey No Drawing. Application October 6, 1949, Serial No. 120,009

9 Claims. (Cl. 167—81)

This invention relates to the production of vitamin $B_{12}$ and especially to the recovery of enhanced yields of vitamin $B_{12}$ from crude materials containing substances closely related to vitamin $B_{12}$ but having markedly lower physiological activity (i. e., anti-pernicious anemia activity and animal protein factor activity) than vitamin $B_{12}$. More particularly, the invention relates to novel procedures by which such vitamin $B_{12}$-like substances are converted to vitamin $B_{12}$.

Various procedures have been disclosed in the literature for obtaining vitamin $B_{12}$ from liver and from fermentation broths. For example, it has been shown by Rickes et al. in Science 108, 634–35 (December 3, 1948) that vitamin $B_{12}$ can be obtained from fermentation broths produced by *Streptomyces griseus*. Pierce et al., J. A. C. S., 71:2952, have also shown that vitamin $B_{12}$ can be obtained from fermentation broths produced by *Streptomyces aureofaciens*. In a pending application of my colleagues, Rickes and Wood, Serial No. 38,175, filed July 10, 1948, there is a more extensive disclosure of the production of vitamin $B_{12}$ and related vitamin substances by fermentation with a number of different organisms of the subphylum *Fungi*. While fermentation broths obtained by the propagation of vitamin $B_{12}$ producing micro-organisms provide a practical source for the commercial production of vitamin $B_{12}$, it has been found that such broths also contain fermentation products which are here referred to as vitamin $B_{12}$-like materials, and which are closely related to vitamin $B_{12}$ but exhibit only a fraction of the anti-pernicious anemia activity and animal protein factor activity exhibited by vitamin $B_{12}$ itself. In producing vitamin $B_{12}$ of uniform purity, the removal of these vitamin $B_{12}$-like materials has presented a difficult problem. Due to the close relationship between these materials and vitamin $B_{12}$, the separation of pure crystalline vitamin $B_{12}$ has been possible only by use of complicated and costly procedures.

I have now discovered that it is possible to convert these heretofore undesirable vitamin $B_{12}$-like materials almost quantitatively to vitamin $B_{12}$, thereby materially simplifying the procedure for recovering pure vitamin $B_{12}$ while at the same time greatly increasing the yield of vitamin $B_{12}$ obtainable from fermentation broths.

Regarded in certain of its broader aspects, the novel process in accordance with the present invention comprises reacting vitamin $B_{12}$-like materials with a substance furnishing cyanide ions thereby converting such materials to vitamin $B_{12}$. Thus, for example, by treating fermentation broths, or suitable concentrates thereof, which contain both vitamin $B_{12}$ and $B_{12}$-like substances with a source of cyanide ions, I find that greatly enhanced yields of pure vitamin $B_{12}$ are obtained. In addition, as indicated previously, the isolation of pure vitamin $B_{12}$ is greatly facilitated.

As a further embodiment of my invention, I have found that this conversion can be effected under various conditions utilizing different sources of cyanide ion. In general, the reaction is effected by intimately contacting $B_{12}$-like substances with cyanide ions, thereby converting these substances to vitamin $B_{12}$. For example, solutions of $B_{12}$-like substances can be treated with compounds furnishing cyanide ions (inter alia metal cyanides, ammonium cyanide, or hydrogen cyanide). Suitable solvent media include aqueous, aqueous-organic solvent mixtures, or organic solvents containing cyanide ions and in which the $B_{12}$-like substances are soluble. For practical purposes, I find it most convenient to carry out the reaction in an aqueous medium.

Although from a study of the reaction, it would appear that one mole of cyanide ion is required per mole of $B_{12}$-like substance, I ordinarily prefer to use an excess of cyanide ion to insure completion of the conversion. In treating an aqueous solution of $B_{12}$-like substances with an excess of a metal cyanide, such as sodium cyanide, or ammonium cyanide, resulting in an alkaline solution, an intermediate purple-colored complex is formed. This purple complex appears to be the same substance as is formed when sodium cyanide is added to an aqueous solution of vitamin $B_{12}$. Upon acidifying a solution containing this purple complex, the solution returns to the red color which is characteristic of vitamin $B_{12}$. However, in the absence of an excess of a metal cyanide, or an alkaline pH, this acidification procedure is not necessary since the purple complex is not formed. When utilizing hydrogen cyanide as a source of the cyanide ion, the purple complex is not formed even when a considerable excess is used.

The vitamin $B_{12}$ obtained by this reaction is in every respect identical with the vitamin $B_{12}$ obtained directly from fermentation broths. This identity has been established by comparison of ultraviolet, visible, and infra-red adsorption spectra, optical rotation, elementary analyses, crystal structure, melting or decomposition points, phase solubility, polarographic behavior, and distribution coefficient, as well as by microbiological and clinical activity.

In carrying out the process of the present invention, vitamin $B_{12}$-like materials in various stages of recovery from fermentation broths can be reacted with a substance supplying cyanide ions. Thus, for example, the fermentation broth can be treated with a small amount of a suitable cyanide such as potassium or sodium cyanide, or alternatively, concentrates of the vitamin $B_{12}$-like materials, alone or in combination with vitamin $B_{12}$, can be treated with a substance furnishing cyanide ions.

When a fermentation broth containing both vitamin $B_{12}$ and $B_{12}$-like substances is treated in accordance with the present invention, a quantity of a substance furnishing an excess of cyanide ions is added to the broth to effect the conversion of the $B_{12}$-like materials to $B_{12}$. The vitamin $B_{12}$ is then adsorbed from this broth on a suitable adsorbent such as fuller's earth, charcoal, etc. This adsorbate can be used as a $B_{12}$ supplement for fortifying animal feeds, or alternatively as a starting material for the isolation of pure vitamin $B_{12}$.

It is preferable in carrying out the process of the present invention, however, to employ a concentrate of the vitamin $B_{12}$-like materials since this reduces the volume of materials to be handled and minimizes the difficulty and dangers involved in disposing of unreacted cyanide. It is also preferred to treat a concentrate containing both vitamin $B_{12}$ and vitamin $B_{12}$-like materials since, as indicated above, one of the practical advantages of the new process is that it eliminates the difficult and involved procedures required to separate these materials.

The solution or solid concentrate containing vitamin $B_{12}$-like materials is treated with a substance providing an excess of cyanide ions in a manner to insure intimate contact of reactants and completion of reaction. Preferably, the mixture is thoroughly agitated and then allowed to stand for a short period of time, i. e., about 15 to 45 minutes. Any substance providing an excess of cyanide ions can be employed, as for example, liquid or gaseous hydrocyanic acid, a metal or ammonium salt of hydrocyanic acid, or mixtures of a metal cyanide and an acid which form hydrocyanic acid in situ. The metal cyanide employed in neutral or alkaline medium need only be one that will furnish cyanide ions under the reaction conditions employed. The alkali and alkaline earth metal cyanides fulfill this requirement. I have found, for example, that the cyanides of sodium, potassium, barium, calcium and strontium may be employed effectively.

When a solid concentrate is treated with liquid or gaseous hydrocyanic acid, there is sufficient ionization of the hydrocyanic acid for the reaction to proceed in absence of a solvent, although a solvent can advantageously be employed. The reaction between vitamin $B_{12}$-like materials and salts of hydrocyanic acid, however, is preferably carried out in the presence of a solvent which will foster ionization of the salt, as for example, water, one to three carbon alcohols, and aqueous-organic solvent mixtures in which the vitamin $B_{12}$-like materials and the substance furnishing cyanide ions are soluble. In large scale operation, the reaction is most conveniently and economically carried out in aqueous alkaline solution.

In stating that an excess of cyanide ion is employed, it is to be understood that this means more than the quantity below which the yield of pure vitamin $B_{12}$ begins to decrease. This amount is best determined experimentally for each crude starting material, since it will be apparent that the composition of various broths and concentrates will vary considerably. An approximation of the amount of cyanide ion required can also be made by measuring the optical density of a sample of material to be treated employing light of 5500Å wave length, one of the characteristic peaks of absorption for pure vitamin $B_{12}$. The value obtained, which represents color due to vitamin $B_{12}$, when present, plus that due to vitamin $B_{12}$-like substances, is calculated as potential vitamin $B_{12}$. For every 1 mg. of potential vitamin $B_{12}$ thus calculated, it is preferred to use about 0.5–2 mg. of cyanide ion, which appears to be a considerable excess.

It will be understood that there are ordinarily present numerous unidentified impurities together with the vitamin $B_{12}$-like materials. Inasmuch as these impurities may also react with cyanide ion, it is necessary to provide a sufficient excess of the ion to satisfy their requirements, as well as enough to insure complete conversion of the $B_{12}$-like materials.

When the reaction is carried out in aqueous solution using a metal cyanide at an alkaline pH, the formation of the afore-mentioned purple complex is a convenient visual indication that an excess of cyanide has been added. The purple complex which is formed is converted to vitamin $B_{12}$ by acidifying the reaction mixture to a pH of about 5 or lower. Common acids such as hydrochloric, sulfuric, and acetic can be employed for acidification.

It is to be understood that the use of an excess of cyanide is not essential since a considerable increase in the yield of vitamin $B_{12}$ can be obtained by using an amount of cyanide which does not react with all of the vitamin $B_{12}$-like materials. It is preferable to use an excess, however, as this gives the maximum yield of vitamin $B_{12}$ and also make unnecessary the difficult procedure of removing the vitamin $B_{12}$-like materials in isolating pure vitamin $B_{12}$.

After completion of the reaction, unreacted cyanide is removed by partial evaporation at an acid pH. The evaporation may be carried out at as high a temperature as 50–60° C. and preferably under reduced pressure. The evaporation is carried out until substantially all the excess hydrogen cyanide is removed. When a solid concentrate is reacted with liquid or gaseous hydrogen cyanide, the unreacted cyanide can be removed by evaporation under vacuum or at atmospheric pressure. When a solution is reacted with cyanide, on the other hand, it is sometimes advisable to employ a stream of nitrogen or air to accelerate removal of unreacted cyanide.

After treatment with cyanide, acidification (where necessary) and removal of unreacted cyanide as hydrogen cyanide, the reaction mixture is further processed to obtain pure vitamin $B_{12}$ therefrom. Various procedures are known for treating vitamin $B_{12}$-containing mixtures to obtain pure vitamin $B_{12}$, and the present invention is not limited to the use of a particular recovery procedure. One such procedure which can be employed in a practical way to recover vitamin $B_{12}$ involves saturating a vitamin $B_{12}$ solution with an inorganic salt (inter alia ammonium sulfate, sodium chloride, sodium sulfate or aluminum sulfate) and extracting the saturated solution with benzyl alcohol, then drying the benzyl alcohol extract as, for example, by heating in vacuo to about 75–80° C. and adding ether to the dry benzyl alcohol solution to effect precipitation of crude vitamin $B_{12}$. The precipitate is then dissolved in water saturated with benzyl alcohol and containing about 2–3% of glacial acetic acid. This solution and approximately an equivalent volume of water saturated with benzyl alcohol are placed in suitable vessels and successively extracted with approximately equivalent portions of benzyl alcohol saturated with water. These extractions can be effected continuously or by successively extracting the two solutions first mentioned with six to eight portions of benzyl alcohol saturated with water. The combined benzyl alcohol extracts are then dried and treated with ether to effect precipitation of purified vitamin $B_{12}$. This precipitate can be dissolved in water and crystallized to obtain vitamin $B_{12}$ of about 95% purity which is preferable for clinical use. Further purification can also be effected by recrystallization from water.

In the event that the precipitate obtained after benzyl alcohol extraction is not sufficiently purified to yield vitamin $B_{12}$ of 95% or higher purity upon crystallization, the precipitate may be further purified by dissolving in methanol, adsorbing vitamin $B_{12}$ from the solution on a column of activated alumina and developing and eluting the column with methanol. The rich effluent when treated with ether yields a new precipitate of purified vitamin $B_{12}$. Alternatively, the further purification can be effected by a repetition of the benzyl alcohol extraction procedure. It will be understood in this connection that aqueous residues in the benzyl alcohol extraction, and fractions of eluate which are low in vitamin $B_{12}$ content in the chromatographic purification step, can be again treated with cyanide ion as herein disclosed and reprocessed to produce additional amounts of vitamin $B^{12}$.

The countercurrent water-benzyl alcohol extraction above-described is more fully disclosed and claimed in my copending joint application, Brink and Wolf, Serial No. 120,352, filed October 8, 1949, (Case No. 2782).

To ascertain the amount of vitamin $B_{12}$ present in various intermediate concentrates and to determine the amount of vitamin $B_{12}$ present before and after the cyanide treatment, it is necessary to have an assay procedure. I have found it advantageous to employ a modification of the countercurrent water-benzyl alcohol extraction as an assay procedure. This procedure is based upon an experimentally determined distribution coefficient for vitamin $B_{12}$ of 1.2 for the system water/benzyl alcohol.

In carrying out the assay procedure, material of unknown vitamin $B_{12}$ content is subjected to an eighth-plate countercurrent distribution between equal-volume portions of water and benzyl alcohol. It has been found that vitamin $B_{12}$-like substances and other interferants have considerably higher distribution coefficients and will be found in the first three plates of the distribution. Additionally, there are found to be present in some instances substances of lower distribution coefficients which will be found in the last three plates of the distribution. The distribution curve for pure vitamin $B_{12}$ reaches a peak at the fourth plate. The optical density of the contents of the fourth (or fifth) plate is measured at 5500Å, and the value obtained represents color due to vitamin $B_{12}$. By comparison with the optical density of pure vitamin $$B_{12}\ (E^{1\%}_{1\ cm.}=63)$$

the vitamin $B_{12}$ content of the plate can be calculated. The fourth plate contains 29.1% (24.2% in the fifth plate) of the total vitamin $B_{12}$ present in the unknown material. In this manner, the total amount of vitamin $B_{12}$ present can be calculated. This assay procedure ordinarily furnishes an absolute value for vitamin $B_{12}$ when the unknown material is high in vitamin $B_{12}$ content, i. e., in excess of about 75%, depending upon the nature of the impurities. With decreasing purity, the procedure is less reliable for determining absolute values owing to the additional interfering impurities; the assay procedure then indicates the maximum amount of vitamin $B_{12}$ present. Crude materials very low in vitamin $B_{12}$ content and containing interfering color may be subjected to countercurrent distribution followed by LLD-assay of the fourth (or fifth) plate, instead of color measurement, and the maximum amount of vitamin $B_{12}$ present is then calculated on the basis of 11,000,000 LLD units per mg. of vitamin $B_{12}$. The following is one method of carrying out the foregoing assay procedure:

To each of eight 15 ml. centrifuge tubes is added 5 ml. of water saturated with benzyl alcohol. To the first tube is added solid material to be assayed in an amount estimated to contain about $\frac{1}{10}$ mg. of vitamin $B_{12}$. To the first tube is then added 5 ml. of benzyl alcohol saturated with water, the tube is shaken, and the phases are separated by centrifugation. The lower (benzyl alcohol) phase is transferred to the second tube, where the process is repeated. This process is continued in each successive tube until the benzyl alcohol phase is in equilibrium with the water of the eighth tube. A second 5 ml. portion of benzyl alcohol saturated with water is then passed through each tube in succession, in the same manner, until it is in equilibrium with the water of the seventh tube. This procedure is continued with six additional portions of benzyl alcohol, after which all eight tubes contain two phases in equilibrium. To the contents of the fourth (or fifth) tube are added 10 ml. of chloroform, to transfer the vitamin $B_{12}$ to the water layer. The optical density of the water layer is then determined at 5500Å in a 1 cm. cell. The total amount of vitamin $B_{12}$ present is then calculated from this value as described above.

The following examples show various procedures for treating vitamin $B_{12}$-like materials with cyanide ion to convert the same to vitamin $B_{12}$, as well as indicating the enhanced yield of vitamin $B_{12}$ obtained by subjecting mixtures containing both vitamin $B_{12}$ and vitamin $B_{12}$-like materials to reaction with cyanide ion. It is to be understood, however, that these examples are given by way of illustration and not of limitation.

EXAMPLE 1

*Preliminary preparation of vitamin $B_{12}$ concentrate*

About 2200 gals. of fermentation broth obtained from the elaboration of a strain of *S. griseus* and assaying 4630 units per ml. of LLD activity was acidified to pH 2.5 with phosphoric acid, given a preliminary clarification filtration with diatomaceous earth, neutralized to pH 7–8 with sodium hydroxide, and again filtered with diatomaceous earth. The filtrate was then treated with 88 lbs. of activated charcoal to adsorb active factors. After removal by filtration, the charcoal was stirred with 45 gals. n-butanol for 15 minutes. To the mixture was added 35 gals. of water and 25 lbs. of filter aid, and the mixture was stirred 45 minutes. (This water-n-butanol elution is more fully disclosed and claimed in a copending application of Briggs, Denkewalter, and Hughey, Serial No. 132,804, filed December 13, 1949, (Case No. 2783).)

The solid was removed by filtration on a basket centrifuge and then washed several times on the centrifuge with a total of about 40 gals. of water which had been previously saturated with butanol. The filtrate and washings were combined and the butanol and water layers separated. The water layer which contained practically all the LLD-active material was filtered to remove carbon fines.

To the 85 gals. of filtered water layer obtained were added 13 gals. of benzyl alcohol and 425 lbs. of ammonium sulfate. The mixture was agitated 15 minutes and was then allowed to stand for 1 hour. The water layer was separated and re-extracted with 8.5 gals. of benzyl alcohol. The benzyl alcohol extracts were combined and dried over anhydrous sodium sulfate. The volume of the dried extracts was about 28 gals. (the volume increase was due to presence of butanol).

The benzyl alcohol solution was then chromatographed on 20 kg. of activated alumina. When the entire solution had been fed to the column, the column was washed with a 1:2 mixture of methanol and acetone until the effluent was water-white. The column was then developed with methanol, collecting all the effluent containing red coloration as rich cut. Fifty-two liters of rich cut were obtained.

The rich effluent was concentrated in vacuo below 35° C. to about 2 liters and precipitated by the addition of one volume of acetone and 4 volumes of ether.

The precipitate was extracted portionwise with methanol until a white residue remained. The optical density of the methanol solution measured at 5500 A indicated a maximum of 416 mg. of vitamin $B_{12}$ and vitamin $B_{12}$-like materials. An aliquot of the methanol solution was treated with ether to effect precipitation and the precipitate subjected to an eight tube countercurrent distribution in the system benzyl alcohol-water. The maximum amount of vitamin $B_{12}$ present as determined by the countercurrent assay procedure was 187 mg.

*Conversion of vitamin $B_{12}$-like materials with cyanide*

The remainder of the solution was divided in half and one half was treated with ether to effect precipitation. The precipitate was dissolved in about 100 ml. of water. Eight ml. of 1% aqueous potassium cyanide solution was added with stirring, and the solution was allowed to stand about 15 minutes. The solution was then treated with hydrochloric acid to about pH 4. Seventy grams of ammonium sulfate were added, and the mixture was extracted with 20 ml., 10 ml., and 10 ml. portions of benzyl alcohol. The benzyl alcohol extracts were dried by heating to 75–80° C. in vacuo, the resulting solution being filtered and treated with ether to effect precipitation.

The precipitate was dissolved in 20 ml. of water which had previously been saturated with benzyl alcohol and to which 0.5 ml. of glacial acetic acid had been added. The solution was placed in a 40 ml. centrifuge tube. To a second 40 ml. centrifuge tube was added 20 ml. of water, saturated with benzyl alcohol. Seven 20 ml. portions of benzyl alcohol, saturated with water, were then passed through the two tubes in countercurrent fashion, each portion of benzyl alcohol being used to extract first tube No. 1 and then tube No. 2. The benzyl alcohol solutions were then combined, dried by heating in vacuo and treated with ether to effect precipitation. (It will be noted that this countercurrent extraction procedure is really equivalent to the countercurrent distribution for the separation of vitamin $B_{12}$ from any residual vitamin $B_{12}$-like materials. It is unnecessary to keep the latter tubes of the countercurrent distribution separate since at this point they all contain essentially pure vitamin $B_{12}$.)

The precipitate obtained was dissolved in 1.1 ml. of water and allowed to crystallize. The crystals were removed by centrifugation and recrystallized by dissolving in 10 ml. of water, adding acetone (about 120 ml.) to turbidity and allowing the solution to stand. The weight of crystals obtained was 127 mg. (dried at 100° C. in vacuo) and showed a purity of 95% by countercurrent distribution assay. The identity of these crystals with authentic vitamin $B_{12}$ was checked by comparison of the physical and chemical properties. The results are tabulated below:

*Comparison of cyanide process product with authentic vitamin $B_{12}$*

|  | Cyanide Process Product | Vitamin $B_{12}$ |
|---|---|---|
| Distribution coefficient, water/benzyl alcohol. | 1.2 | 1.2 |
| Absorption spectrum, λ max. (Å). | 2780, 3615, 5500 | 2780, 3610, 5500 |
| Infra-red absorption | Both materials corresponded in detail | |
| Indices of refraction: | | |
| α | 1.618±0.002 | 1.616±0.002 |
| β | 1.650±0.002 | 1.652±0.002 |
| γ | 1.668±0.002 | 1.664±0.002 |
| Optical rotation, $[\alpha]_{6563 Å}^{25°}$ | −61°±9 | −59°±9 |
| Solubility comparison | Determination of absolute solubility in aqueous solution as well as mixed solubility in a solution saturated with authentic vitamin $B_{12}$ indicated that both materials were identical. | |

The water solution remaining from the modified countercurrent distribution described above was retreated with aqueous potassium cyanide, the solution was again acidified and then extracted with 2:1 carbon tetrachloride-cresol solution and the extracts were treated with ether to effect precipitation. The precipitate was dissolved in a small amount of methanol and again treated with ether to effect precipitation. The precipitate was then dissolved in 0.13 ml. of water and allowed to crystallize. The crystals were recrystallized in water-acetone mixture. The weight of crystals obtained was 47 mg. (dried at 100° C. in vacuo). The crystals were found to be 73% pure vitamin $B_{12}$ by countercurrent distribution assay.

Thus there was obtained the equivalent of 153.3 mg. of pure vitamin $B_{12}$ from 1100 gals. of fermentation broth employing the new process.

The second half of the original methanolic solution was found to yield about 50 mg. of vitamin $B_{12}$ when treated in substantially the same manner as was the first half except that the cyanide was omitted, indicating that the cyanide treatment resulted in a three-fold increase in the amount of vitamin $B_{12}$ isolated.

When the foregoing procedure is repeated using ammonium, barium, and calcium cyanide in place of potassium cyanide, the results in each instance show approximately a three-fold increase in the amount of vitamin $B_{12}$ recovered due to the cyanide treatment.

EXAMPLE 2

An intermediate concentrate obtained from propagation of *S. griseus* containing vitamin $B_{12}$ and vitamin $B_{12}$-like substances was purified by countercurrent distribution between water and benzyl alcohol, employing two tubes of water and passing through each in succession a total of seven portions of benzyl alcohol, in the manner described in Example 1. The concentrate had not been treated previously with cyanide. The purified material in the benzyl alcohol extracts was further processed to yield pure vitamin $B_{12}$. The water layers, which contained vitamin $B_{12}$-like materials, a small amount of vitamin $B_{12}$, and unknown impurities, were combined and treated with ether, and an amorphous precipitate formed, which was separated and dried. When operating according to prior methods, this precipitate was normally reworked with other off-fractions to provide a small additional recovery of vitamin $B_{12}$ after numerous purification steps. However, there was still a considerable loss of the active substances present.

One portion of the amorphous precipitate was processed for comparison purposes and several parts were treated with cyanide as follows:

(a) A portion of the precipitate was dissolved in water and spectrographically analyzed. Adsorption peaks were observed at 3610Å and 5200Å. The solution was then subjected to countercurrent distribution between water and benzyl alcohol in the manner described in the assay procedure. The optical density measurements on the fifth tube of the countercurrent distribution indicated that a maximum of 51% of the total vitamin $B_{12}$ and vitamin $B_{12}$-like substances present was actually vitamin $B_{12}$, representing 0.112 mg. of vitamin per mg. of original solid.

(b) Ten and five tenths mg. of the amorphous precipitate was dissolved in 3 ml. of water, and 0.2 ml. of liquid hydrogen cyanide was added. The solution was allowed to stand for a short time then heated at 50–60° C. to remove excess hydrogen cyanide. Spectographic analyses of the resulting solution showed adsorption peaks at 3610Å, 5200Å, and 5500Å, indicating a shift towards the vitamin $B_{12}$ spectrum. The solution was subjected to countercurrent distribution between water and benzyl alcohol. Measurement of the optical density of the solution in the fifth tube showed that 88.3% of the total vitamin $B_{12}$ and vitamin $B_{12}$-like substances present was vitamin $B_{12}$, representing 0.220 mg. of vitamin $B_{12}$ per mg. of starting material, an increase of 96%.

(c) Nine and six tenths mg. of the amorphous precipitate was dissolved in 2 ml. of methanol and 0.2 ml. of liquid anhydrous hydrogen cyanide was added. The solution was allowed to stand in an ice bath for 15 minutes and then heated at 50–60° C. to dryness. The residue was dissolved in water and spectrographic analyses showed adsorption peaks at 3610Å, 5200Å, and 5500Å, indicating a shift towards the vitamin $B_{12}$ spectrum.

The aqueous solution was subjected to countercurrent distribution between water and benzyl alcohol. The measurement of the optical density of the material in the fifth tube showed that 81% of the total vitamin $B_{12}$ and vitamin $B_{12}$-like substances was vitamin $B_{12}$, representing 0.219 mg. of vitamin $B_{12}$ per mg. of starting material, an increase of 95.5%.

Three additional parts of the amorphous precipitate were treated with liquid anhydrous hydrogen cyanide in ethanol, benzyl alcohol, and cresol solution, respectively, instead of in methanol solution. Increases in vitamin $B_{12}$ content were obtained in all cases, the increases being of the same order of magnitude as that obtained employing methanol.

(d) Ten and eight tenths mg. of amorphous precipitate was thoroughly mixed with 2.2 ml. of liquid anhydrous hydrogen cyanide and allowed to stand until the hydrogen cyanide had evaporated. The residue was dissolved in water and spectrographic analyses of the resulting solution showed adsorption peaks at 3610Å, 5200Å, and 5500Å, indicating a shift towards the vitamin $B_{12}$ spectrum. The aqueous solution was subjected to countercurrent distribution between water and benzyl alcohol. Measurement of the optical density of the fifth tube indicated that 81% of the total vitamin $B_{12}$ and vitamin $B_{12}$-like substances was vitamin $B_{12}$, representing 0.198 mg. of vitamin $B_{12}$ per mg. of starting material, an increase of 77%.

EXAMPLE 3

Three thousand gals. of fermentation broth from several batches obtained from the propagation of a strain of *S. griseus* were processed through charcoal adsorption, butanol-water elution, benzyl alcohol extraction, chromatography, and precipitation as described in Example 1. The precipitated solids were extracted with methanol until a white residue remained. The optical density of the methanolic solution obtained when measured at 5500Å and compared with the value for pure vitamin $B_{12}$ indicated that 540 mg. of vitamin $B_{12}$ and vitamin $B_{12}$-like substances were present. To the methanolic solution was added acetone and ether to effect precipitation, until the liquors contained no pink coloration.

The precipitate was dissolved in 300 ml. of water and adjusted to about pH 8 with aqueous sodium hydroxide solution. To this solution was added 2.7 gms. of sodium cyanide, and the solution was allowed to stand, with some agitation, for 45 minutes. (The solution had a purple color indicating that a definite excess of cyanide had been added.) The solution was then acidified to about pH 3 with hydrochloric acid, and nitrogen was passed through the solution to remove hydrogen cyanide. 210 gms. of ammonium sulfate was added to the solution, and it was extracted with 50 ml., 25 ml., 25 ml., 25 ml., and 10 ml. portions of benzyl alcohol. The extracts were dried by heating at 75–80° C., in vacuo, and the dried extracts were filtered through a sintered glass funnel. Ether was added to the filtrate to effect precipitation.

The precipitate was dissolved in 100 ml. of water to which 2 ml. of glacial acetic acid had been added, and 100 ml. of benzyl alcohol-saturated water was placed in a second tube. A modified countercurrent distribution purification process was carried out by passing seven 100 ml. portions of water-saturated benzyl alcohol through each tube in succession, as described in Example 1, and the benzyl alcohol extracts were combined after removal from the second tube. The combined extracts were dried by heating at 75–80° C., in vacuo. Ether was added to the dried extracts to effect precipitation.

The precipitate was dissolved in methanol and chromatographed on activated alumina, developing the column with methanol. The rich effluent was treated with ether to effect precipitation. The tail cuts from chromatography, containing color at 5500Å which when calculated as vitamin $B_{12}$ was the equivalent of about 90 mg. of vitamin $B_{12}$, were saved for reworking. The precipitate was dissolved in 1.9 ml. of water and allowed to crystallize. The red crystals were dissolved in 20 ml. of water, and the solution was filtered. An additional 20 ml. of water was used to wash the equipment and was added to the solution. 520 ml. of acetone were added and crystallization occurred. The crystals were removed by centrifugation, washed with acetone, and dried at 56° C., in vacuo. There was obtained 324.7 mg. of red crystals. A sample of the crystals lost 5% of their weight on drying at 100° C. The dried sample was found to be 94% pure vitamin $B_{12}$ by the countercurrent distribution assay, indicating a recovery of 290 mg. of pure vitamin $B_{12}$.

It was found that substantially the same results were obtained when the cyanide treatment was carried out in aqueous methanol and aqueous ethanol solution.

EXAMPLE 4

The cyanide treatment for the conversion of vitamin $B_{12}$-like materials to vitamin $B_{12}$ was applied to fermentation broth, and an evaluation of the conversion was carried out by using the countercurrent assay procedure. Three liters of fermentation broth obtained from the elaboration of a strain of *S. griseus* was treated with 2.1 gm. of sodium cyanide dissolved in a small amount of water. The solution was stirred for 2 hours and brought to pH 4 with concentrated hydrochloric acid. Vacuum was applied so that air bubbled through the solution overnight. To the solution was added 2150 gm. of ammonium sulfate and 30 ml. of benzyl alcohol. The mixture was stirred and allowed to settle and the benzyl alcohol layer drawn off. The aqueous layer was then re-extracted with one 20 ml. and three 10 ml. portions of benzyl alcohol. The spent water layer which contained no LLD activity was discarded. The combined benzyl alcohol extracts were diluted with 2 volumes of chloroform and extracted with three 5 ml. portions of water. Ten ml. of the water solution containing about 300,000 LLD units per ml. was subjected to an eight plate countercurrent distribution with benzyl alcohol using 10 ml. phases. The results of the countercurrent distribution are shown in the accompanying table.

The identical treatment was carried out on 3 liters of the same broth except that no sodium cyanide was added. The original water solution obtained through benzyl alcohol extraction was again subjected to countercurrent distribution of benzyl alcohol. Further results are shown in the table.

*The Effect of Sodium Cyanide on Conversion of LLD Activity in Broth to Vitamin $B_{12}$*

[Results of countercurrent distribution assay in the system benzyl alcohol-water]

| Tube No. | Percentage Distribution | | |
|---|---|---|---|
| | Untreated Broth | Treated Broth | Pure Vitamin $B_{12}$ |
| 1 | 28.7 | 1 | 1.4 |
| 2 | 19.1 | 6.1 | 8.3 |
| 3 | 23.4 | 29.0 | 20.9 |
| 4 | 15.5 | 29.2 | 29.1 |
| 5 | 5.4 | 20.9 | 24.2 |
| 6 | 3.9 | 11.2 | 12.1 |
| 7 | 2.6 | 2.6 | 3.3 |
| 8 | 0.7 | 0.9 | 0.4 |

The above table shows a marked shift in the countercurrent distribution behavior of the LLD activity towards the typical behavior for vitamin $B_{12}$ after treatment of the broth with sodium cyanide. From the above data, it is not possible to calculate exactly the amounts of vitamin $B_{12}$ contained in the treated and untreated broths. However, it will be seen that the distribution of the treated broth is different from the untreated broth and very similar to the distribution of pure vitamin $B_{12}$. Further, it is evident that the activity of the treated broth in the fourth tube (which tube shows a maximum vitamin $B_{12}$ content) is almost double that of the untreated broth.

EXAMPLE 5

A fermentation broth was obtained by the propagation of a strain of *S. griseus*. 100 liters of the broth was acidified to pH 2.5 using hydrochloric acid. The broth was then treated with 220 mg. of sodium cyanide, and the batch was stirred for 10 minutes. 100 grams of fuller's earth and 100 gm. of diatomaceous earth were added, the resulting slurry was agitated for 30 minutes, and the adsorbate was removed by filtration and dried at 50° C. The adsorbate exhibited an activity of 843,000 units per gm. when tested on *L. lactis* Dorner by the cup assay and was found to promote the growth of chicks.

Essentially all the active material in the broth is adsorbed by treatment with fuller's earth under the conditions described. Since the vitamin $B_{12}$ content of the broth is markedly increased by the cyanide treatment, as shown in Example 4, the vitamin $B_{12}$ content of the adsorbate thus prepared from treated broth is proportionately increased.

Various changes and modifications in the foregoing procedures will occur to those skilled in the art, and to the extent that such changes and modifications are embraced by the appended claims, it is to be understood that they constitute part of my invention.

I claim:

1. In a process for recovering vitamin $B_{12}$ from a starting material selected from the class consisting of fermentation broths obtained by the propagation of a vitamin $B_{12}$ producing micro-organism in a suitable nutrient medium and concentrates thereof, the step that comprises treating the starting material with a substance furnishing cyanide ions, thereby obtaining a reaction mixture containing an increased amount of vitamin $B_{12}$.

2. The process as defined in claim 1 wherein the substance furnishing cyanide ions is an ionizable salt of hydrocyanic acid.

3. The process as defined in claim 1 wherein the substance furnishing cyanide ions is sodium cyanide.

4. The process as defined in claim 1 wherein the substance furnishing cyanide ions is ammonium cyanide.

5. The process as defined in claim 1 wherein the substance furnishing cyanide ions is hydrocyanic acid.

6. In a process for recovering vitamin $B_{12}$ from a fermentation broth obtained by the propagation of a vitamin $B_{12}$ producing micro-organism in a suitable nutrient medium, the step that comprises treating the broth with a substance furnishing cyanide ions, thereby obtaining a reaction mixture containing an increased amount of vitamin $B_{12}$.

7. In a process for recovering vitamin $B_{12}$ from a concentrate of a fermentation broth obtained by the propagation of a vitamin $B_{12}$ producing micro-organism in a suitable nutrient medium, the step that comprises treating the concentrate with a substance furnishing cyanide ions, thereby obtaining a reaction mixture containing an increased amount of vitamin $B_{12}$.

8. The process as defined in claim 7 wherein treatment of the concentrate with a substance furnishing cyanide ions is carried out in the presence of a solvent selected from the group consisting of water, 1-3 carbon alcohols and mixtures thereof.

9. The process as defined in claim 7 wherein a solid concentrate is treated with anhydrous hydrocyanic acid.

FRANK J. WOLF.

REFERENCES CITED

The following references are of record in the file of this patent:

Science, vol. 107, April 16, 1948, pages 396 to 398.

Dounce, Science, Jan. 1, 1943, vol. 97, pages 21 to 23.